United States Patent Office 3,812,014
Patented May 21, 1974

3,812,014
PROCESS FOR PREPARING LINCOMYCIN
Alexander D. Argoudelis, Portage, and John H. Coats, Kalamazoo, Mich., assignors to The Upjohn Company, Kalamazoo, Mich.
No Drawing. Filed Aug. 8, 1972, Ser. No. 278,784
Int. Cl. C12d 9/00
U.S. Cl. 195—80 R                     3 Claims

ABSTRACT OF THE DISCLOSURE

A microbiological process for preparing the antibiotic lincomycin without the concomitant production of lincomycin B (4′-depropyl-4′-ethyllincomycin). The absence of lincomycin B in the fermentation beer results in increased lincomycin recovery efficiency from the fermentation beer.

BRIEF SUMMARY OF THE INVENTION

Lincomycin is a useful antibiotic produced by a fermentation process using the microorganism *Streptomyces lincolnensis* var. *lincolnensis*. In U.S. Pat. 3,086,912 there is described a fermentation and recovery process for the production of lincomycin, formerly known as lincolnensin. Lincomycin B, a nitrogenous base having the molecular formula $C_{17}H_{32}N_2O_6S$, is concomitantly produced in the lincomycin fermentation disclosed in U.S. 3,086,912. Though lincomycin and lincomycin B have activity against essentially the same spectrum of microorganisms, it is known that lincomycin B is significantly less active against said microorganisms than is lincomycin. Accordingly, lincomycin is the preferred antibiotic of the two.

The microbiological process of the subject invention comprises the use of a novel microorganism to produce lincomycin without the concomitant production of lincomycin B.

DETAILED DESCRIPTION OF THE INVENTION

The microorganism

The novel actinomycete used according to this invention for the production of lincomycin is *Streptomyces variabilis* chemovar *liniabilis* Dietz var. nova. One of its strain characteristics is the production of lincomycin without the concomitant production of lincomycin B. A subculture of this living organism can be obtained upon request from the permanent collection of the Northern Utilization and Research Division, Agricultural Research Services, U.S. Department of Agriculture, Peoria, Ill., U.S.A. Its accession number in this repository is NRRL 5618.

The microorganism of this invention was studied and characterized by Alma Dietz of The Upjohn Research Laboratory.

DESCRIPTION OF THE MICROORGANISM

*Streptomyces variabilis* chemovar *liniabilis* UC 5484 is compared with the type species *Streptomyces variabilis*.

Color characteristics.—Aerial growth gray-white to lavender-gray. Melanin-negative. Appearance on Ektachrome [Dietz, A., 1954. Ektachrome transparencies as aids in actinomycete classification. Ann. N.Y. Acad. Sci. 60:152–154] is given in Table 1. Reference color characteristics are given in Table 2. The cultures may be placed in the Gray (GY) or White (W) color series of Tresner and Backus [Tresner, H. D., and E. J. Backus, 1963. System of color wheels for streptomycete taxonomy. Appl. Microbiol. 11:335–338].

Microscopic characteristics.—Sporophores in the sense of Pridham et al. [Pridham, T. G., C. W. Hesseltine, and R. G. Benedict. 1958. A guide for the classification of Streptomyces according to selected groups. Placement of strains in morphological sections. Appl. Microbiol. 6:52–79] are flexuous (RF) to open spiral (RA) for *S. variabilis* chemovar *liniabilis*; flexuous (RF) to open spiral (RA) to spiral (S) for *S. variabilis*. Sporophores are short to moderate in length. Spores, examined by the electron microscope procedures of Dietz and Mathews [Dietz, A., and J. Mathews. 1962. Taxonomy by carbon replication. I. An examination of *Streptomyces hygroscopicus*. Appl. Microbiol. 10:258–263; 1970. Classification of Streptomyces spore surfaces into five groups. Appl. Microbiol. 21:527–533], are oval to rectangular with a sparsely warty to spiny surface.

Cultural characteristics.—See Table 3.

Growth on carbon compounds.—Growth of the cultures on carbon compounds was determined using the synthetic medium of Pridham and Gottlieb [Pridham, T. G., and D. Gottlieb. 1948. The utilization of carbon compounds by some Actinomycetales as an aid for species determination. J. Bacteriol. 56:107–114], Table 4, and the synthetic medium of Shirling and Gottlieb [Shirling, E. B., and D. Gottlieb. 1966. Methods for characterization of Streptomyces species. Int. J. Syst. Bacteriol. 16:313–340], Table 5.

Temperature.—Both cultures grew at temperatures of 18° C.–55° C. on Bennett's, Czapek's sucrose, and maltose-tryptone agars. Growth at 18° C. and 55° C. was poor and predominantly vegetative. Optimum growth for *S. variabilis* was at 28° C.–45° C.; for the new variant at 24° C.–45° C.

Antibiotic-producing properties.—*Streptomyces variabilis*, has uncharacterized antibacterial properties [Gauze, G. F., T. P. Preobrazhenskaya, E. S. Kudrina, N. O. Blinov, I. D. Ryabova, and M. A. Iveshnikova. 1957. Problems in the classification of antagonistic actinomycetes. State Publishing House for Medical Literature, Moscow. English edition translated by Fritz Danga; David Gottlieb ed. The American Institute of Biological Sciences, Washington, D.C.]. *Streptomyces variabilis* chemovar *liniabilis* produces the antibiotic lincomycin.

Source.—Soil.

Type species.—*Streptomyces variabilis* (Preobrazhenskaya et al.) Pridham et al. INA 5557/54, ATCC 19930, UC 5511.

Type variety.—The type variety is understood to be the same epithet as the type species. (Rule 7 of the International Code of Nomenclature of Bacteria) [International Code of Nomenclature of Bacteria. 1966. Edited by the Editorial Board of the Judicial Commission of the International Committee on Nomenclature of Bacteria. Intern. J. System. Bacteriol. 16:459–490].

Chemovar.—*Streptomyces variabilis* chemovar *liniabilis* Dietz. var. nova.

DISCUSSION

*Streptomyces variabilis* chemovar *liniabilis* is a soil isolate characterized as a new variety of the type species *Streptomyces variabilis*.

The culture has the unique characteristic of production of the antibiotic lincomycin.

The new lincomycin-producing culture is very similar to the type culture *Streptomyces variabilis* (Preobrazhenskaya et al. [Gauze, G. F., T. P. Preobrazhenskaya, E. S. Kudrina, N. O. Blinov, I. D. Ryabova, and M. A. Iveshnikova. 1957. Problems in the classification of antagonistic actinomycetes. State Publishing House for Medical Literature, Moscow. English edition translated by Fritz Danga; David Gottlieb ed. The American Institute of Biological Sciences, Washington, D.C.]) Pridham et al. [Shirling, E. B. and D. Gottlieb, 1968. Cooperative description of type cultures of Streptomyces. II. Species descriptions from first study. Int. J. Syst. Bacteriol. 18:69–189]. The cultures differ slightly in color pattern and utilization of carbon compounds as may be noted in the tables. The chemical entity (the antibiotic lincomycin) is produced by the new soil isolate. Therefore, it is proposed that the new culture be designated *Streptomyces variabilis* chemovar. *liniabilis* Dietz var. nova. This designation is in conformance to Rule 8, Recommendation 8a of the International Code of Nomenclature of Bacteria [International Code of Nomenclature of Bacterio. 1966. Edited by the Editorial Board of the Judicial Commission of the International Committee on Nomenclature of Bacteria. Intern. J. System. Bacteriol. 16:459–490] by which the term "chemovar" may be used to designate a strain producing some chemical not normally produced by the type strain of the species.

The characteristics of *Streptomyces variabilis* chemovar *liniabilis*, NRRL 5618, are given in the following tables:

Table 1.—Appearance of *S. variabilis* Cultures on Ektachrome

Table 2.—Reference Color Characteristics of *S. variabilis* Cultures

Table 3.—Cultural and Biochemical Characteristics of *Streptomyces variabilis* Cultures Table 4.—Growth on Carbon Compounds in the Synthetic Medium of Pridham and Gottlieb Table 5.—Growth on Carbon Compounds in the Synthetic Medium of Shirling and Gottlieb

TABLE I
Appearance of *S. variabilis* cultures on Ektachrome [1]

| Agar medium | *S. variabilis* chemovar *liniabilis* | *S. variabilis* ATCC 19930 |
|---|---|---|
| Bennett's: | | |
| S | Trace lavender-gray | Pale lavender-gray. |
| R | Cream-yellow | Yellow. |
| Czapek's sucrose: | | |
| S | Lavender-gray | Pale lavender-gray. |
| R | do | Gray-cream. |
| Maltose-tryptone: | | |
| R | Cream gray | Yellow. |
| Peptone-iron: | | |
| S | Colorless | Colorless. |
| R | Yellow | Yellow. |
| 0.1% tyrosine: | | |
| S | Trace gray | Trace gray. |
| R | Red | Red. |
| Casein starch: | | |
| S | Trace gray | Colorless. |
| R | Pale gray | Do. |

[1] Dietz, A. 1954. Ektachrome transparencies as aids in actinomycete classification. Ann. N.Y. Acad. Sci. 60:152-154.

NOTE.—S=surface.  R =reverse.

TABLE II
Reference color characteristics of *S. variabilis* cultures

| | Color harmony manual, 3rd ed., 1948[a] | | NBS circular 553, 1955[b] | |
|---|---|---|---|---|
| Agar medium | *S. variabilis* chemovar *liniabilis* | *S. variabilis* ATCC 19930 | *S. variabilis* chemovar *liniabilis* | *S. variabilis* ATCC 19930 |
| Bennett's: | | | | |
| S | 5 dc pusseywillow gray | 3 fe silver gray | 10 gm pinkish gray | 63 gm light brownish gray. |
| R | 2 ec biscuit, ecru, oatmeal, sand. | 2 ec biscuit ecru, oatmeal, sand. | 90 gm grayish yellow | 90 gm grayish yellow. |
| P | 2 ge covert tan, griege | | do | |
| Czapek's sucrose: | | | | |
| S | do | c light gray | do | 264 gm light gray. |
| R | do | 3 ec bisque, light beige | do | {79 gm light grayish yellowish brown. {90 g grayish yellow. |
| P | | | | |
| Maltose-tryptone: | | | | |
| S | 5 cb | a white | | 263 gm white. |
| R | 2 gc bamboo, chamois | 4 ie cork tan | 90 gm grayish yellow | 57 gm light brown. |
| P | | | | |
| Yeast extract-malt extract (ISP-2): | | | | |
| S | 5 dc pusseywillow gray | 3 dc natural | 10 gm pinkish gray | |
| R | 2 gc bamboo, chamois | 4 ni chestnut brown, spcie brown. | 90 gm grayish yellow | 58 gm moderate brown. |
| P | | | | |
| Oatmeal (ISP-3): | | | | |
| S | 1 ba yellow tint | 3 dc natural | {92 m yellowish white {121 gm pale yellow green | |
| R | do | 2 ie light mustard tan | {92 m yellowish white {121 gm pale yellow green. | {91 gm dark grayish yellow. {94 g light olive brown. {106 g light olive. |
| P | 2 ec biscuit, ecru oatmeal, sand. | | 90 gm grayish yellow | |
| Inorganic-salts starch (ISP-4): | | | | |
| S | 5 dc pusseywillow gray | e gray | 10 gm pinkish gray | |
| R | 2 ge covert tan, griege | 2 ge covert tan, griege | {94 m light olive brown. {109 gm light grayish olive. | 94m light olive brown. 109 gm light grayish olive. |
| P | 2 ec biscuit, ecru, oatmeal, sand. | do | 90 gm grayish yellow | 94 m light olive brown. |
| Glycerol-asparagine (ISP-5): | | | | |
| S | a white | 3 dc natural | 263 gm white | |
| R | 1½ ca cream | 3 ec biscuit, light beige | 89 gm pale yellow | {79 gm light grayish. {94 m light olive browm. |
| P | | | | |

[a] Jacobson, E., W. C. Granville, and C. E. Foss. 1948. Color harmony manual, 3rd ed. Container Corporation of America, Chicago.
[b] Kelly, K. L., and D. B. Judd. 1955. The ISCC-NBS method of designating colors and a dictionary of color names. U.S. Dept. of Comm. Circ. 553, Washington, D.C.

NOTE.—S=surface.  R=reverse.  P=pigment.

TABLE III
Cultural and biochemical characteristics of *Streptomyces variabilis* cultures

| Medium | | *S. variabilis* chemovar *liniabilis* | *S. variabilis* ATCC 19930 |
|---|---|---|---|
| Agar (in petri plates): | | | |
| Peptone-iron: | S | Trace pale gray-white | Trace pale gray. |
| | R | Pale tan | Pale yellow-tan. |
| | P | | |
| | O | Melanin negative | Melanin negative. |
| Calcium malate: | S | Pale gray | |
| | R | Cream | Pale red-tan. |
| | P | | Pale pink. |
| | O | Malate solubilized | Malate not solubilized. |
| Glucose-asparagine: | S | Pale gray | |
| | R | Yellow-cream | Pale yellow-tan. |
| | P | | |
| Skim milk: | S | Pale lavender-gray | Very slight trace gray. |
| | R | Orange-tan | Orange-tan. |
| | P | do | Do. |
| | O | Casein solubilized | Casein solubilized. |
| Tyrosine: | S | Lavender-gray | Fair pale lavender-gray. |
| | R | Red | Orange-tan. |
| | P | Red | Do. |
| | O | Tyrosine solubilized | Tyrosine solubilized. |
| Xanthine: | S | Pale lavender-gray | Fair gray-white. |
| | R | Yellow cream | Pale olive-gray. |
| | P | Cream | Do. |
| | O | Xanthine solubilized | Xanthine solubilized. |
| Nutrient starch: | S | Lavender-gray | Pale gray-pink. |
| | R | Cream | Pale olive-gray. |
| | P | | Do. |
| | O | Starch hydrolyzed around growth | Starch hydrolyzed. |
| Yeast extract-malt extract: | S | Heavy lavender-gray | Good pale pink. |
| | R | Brown | Red-tan. |
| | P | do | Do. |
| Tubed media: | | | |
| Gelatin: | | | |
| Plain | S | Colorless surface growth dropping to bottom. | |
| | O | Gelatin liquefied | Gelatin liquefied. |
| Nutrient | S | Colorless surface growth dropping to bottom. | |
| | O | Gelatin liquefied | Do. |
| Broth: | | | |
| Litmus milk: | S | Colorless to gray surface pellicle. | Colorless surface pellicle. |
| | O | Slight reduction of litmus. No peptonization. pH 6.0 | Litmus reduced. Peptonization. pH 7.8. |
| Synthetic nitrate: | S | Colorless to pale yellow granular surface ring and pellicle. | Colorless surface ring. |
| | P | Pale yellow pigment | |
| | O | Compact to flocculent bottom growth. Nitrate not reduced to nitrite. | Flocculent growth throughout and at base. Nitrate not reduced to nitrite. |
| Nutrient nitrate: | S | Colorless surface ring | Heavy colorless surface ring. |
| | P | | Yellow. |
| | O | Flocculent at base. Nitrate not reduced to nitrite. | Flocculent at base. Nitrate not reduced to nitrite. |
| Agar: | | | |
| Peptone-yeast extract-iron (ISP-6): | S | | |
| | R | Light tan | Tan. |
| | P | do | Tan. |
| | O | Melanin-negative | Melanin-negative. |
| Tyrosine (ISP-7): | S | Poor gray-white | Pale gray-white. |
| | R | Light tan | |
| | P | | |
| | O | Melanin-negative | Melanin-negative. |

NOTE.—S=surface. R=reverse. P=pigment. O=other characteristics.

TABLE IV
Growth on carbon compounds in the synthetic medium of Pridham and Gottlieb[1]

| | | *S. variabilis* chemovar *liniabilis* | *S. variabilis* ATCC 19930 |
|---|---|---|---|
| | Control | (−) | (−) |
| 1 | D-xylose | + | (−) |
| 2 | L-arabinose | + | + |
| 3 | Rhamnose | + | + |
| 4 | D-fructose | + | + |
| 5 | D-galactose | + | + |
| 6 | D-glucose | + | + |
| 7 | D-mannose | + | + |
| 8 | Maltose | + | + |
| 9 | Sucrose | (+) | + |
| 10 | Lactose | + | + |
| 11 | Cellobiose | + | + |
| 12 | Raffinose | (+) | (−) |
| 13 | Dextrin | + | + |
| 14 | Inulin | (−) | (−) |
| 15 | Soluble starch | + | + |
| 16 | Glycerol | + | + |
| 17 | Dulcitol | (−) | (−) |
| 18 | D-mannitol | + | + |
| 19 | D-sorbitol | + | (−) |
| 20 | Inositol | + | + |
| 21 | Salicin | (−) | (+) |
| 22 | Phenol | (−) | − |
| 23 | Cresol | − | − |
| 24 | Na formate | (−) | (−) |
| 25 | Na oxalate | (−) | (−) |
| 26 | Na tartrate | (−) | (−) |
| 27 | Na salicylate | − | − |
| 28 | Na acetate | + | (+) |
| 29 | Na citrate | (−) | (+) |
| 30 | Na succinate | + | (+) |

[1] Pridham, T. G., and D. Gottlieb, 1948. The Utilization of Carbon Compounds by Some Actinomycetales as an Aid for Species Determination. J. Bacteriol. 56:107–114.

NOTE: += Good growth. (+) = Fair growth. (−) = Poor growth. − = No growth.

TABLE V
Growth of carbon compounds in the synthetic medium of Shirling and Gottlieb[1]

| Compound | *S. variabilis* chemovar *liniabilis* | *S. variabilis* ATCC 19930 |
|---|---|---|
| Negative control (basal agar) | Slight growth | No growth. |
| Positive control (basal agar plus D-glucose) | Good growth | Good growth. |
| L-arabinose | ± | ++. |
| Sucrose | ± | −. |
| D-xylose | ++ | ++. |
| Inositol | ++ | ++. |
| D-mannitol | ++ | ++. |
| D-fructose | ++ | ++. |
| Rhamnose | ++ | ++. |
| Raffinose | − | −. |
| Cellulose | − | −. |

[1] Shirling, E. B., and D. Gottlieb. 1966. Methods for characterization of Streptomyces species. Int. J. Syst. Bacteriol. 16:313–340.

NOTES:
++ = Growth equal to or greater than with glucose.
± = Growth only slightly better than on basal medium without carbon compound and significantly less than with glucose.
− = No growth.

Lincomycin is produced by the novel microorganism of the subject invention when said microorganism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, usually need not be added to the fermentation media since tap water and unpurified ingredients are used as media components.

Production of lincomycin by the process of the invention can be effected at any temperature conducive to satisfactory growth of the novel microorganism, for example, between about 18° and 40° C., and preferable between about 20° and 32° C. Ordinarily, optimum production of lincomycin is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of lincomycin and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of lincomycin, as long as it is such that a good growth of the microorganism is obtained.

The microorganism of the subject invention can also be grown in the media and under the conditions disclosed in U.S. Pat. 3,086,912. Further, the lincomycin compound produced by the subject process can be recovered by the procedures disclosed in U.S. 3,086,912.

In a preferred recovery process, lincomycin is recovered from its culture medium by separation of the mycelia and undissolved solids by conventional means, such as by filtration and centrifugation. Lincomycin is then recovered from the filtered or centrifuged broth by passing said broth over a resin which comprises a non-ionic macro porous copolymer of styrene crosslinked with divinylbenzene. Resins of this type are disclosed in U.S. Pat. 3,515,717. Exemplary of this type of resin is Amberlite XAD-2. Lincomycin is eluted from the resin with a solvent system consisting of methanol-water (95:5 v./v.). Bioactive eluate fractions are determined by a standard microbiological disc plate assay using the microorganism *Sarcina lutea*. Biologically active fractions are combined, concentrated to an aqueous and freeze dried. The freeze dried material is then triturated with methylene chloride. The methylene chloride extract is concentrated to dryness and the residue triturated with acetone. The filtrate is mixed with ether to give a precipitate which is separated. The remaining filtrate is mixed with methanolic hydrogen chloride (1 N) to precipitate colorless lincomycin hydrochloride. This precipitate is isolated by filtration and crystallized from water-acetone to give crystalline lincomycin hydrochloride.

The process of the subject invention facilitates the recovery of lincomycin because of the absence of lincomycin B.

It is to be understood that the process of the subject invention, though described in detail with particular reference to the novel microorganism *Streptomyces variabilis* chemovar *liniabilis*, NRRL 5618, is not limited to this particular microorganism or to microorganisms fully described by the cultural characteristics disclosed herein. It is intended that this invention also include other strains or mutants of the said microorganism which can be produced by procedures well known in the art, for example, by subjecting the novel microorganism to X-ray or ultraviolet radiation, nitrogen mustard, phage exposure, and the like.

Hereinafter are described non-limiting examples of the process of the present invention. All percentages are by weight and all solvent mixture portions are by volume unless otherwise noted.

EXAMPLE 1

(A) Fermentation

A soil slant of *Streptomyces variabilis* chemovar *liniabilis*, NRRL 5618, is used to inoculate a series of 500-ml. Erlenmeyer flasks each containing 100 ml. of seed medium consisting of the following ingredients:

| | G./liter |
|---|---|
| Glucose monohydrate | 25 |
| Pharmamedia[1] | 25 |
| Tap water, q.s. balance. | |

[1] Pharmamedia is an industrial grade of cottonseed flour produced by Traders Oil Mill Company, Fort Worth, Tex.

The flasks are grown for 3 days at 28° C., on a rotary shaker.

Seed inoculum, described above, is used to inoculate a series of 500-ml. Erlenmeyer fermentation flasks containing 100-ml. of sterile medium consisting of the following ingredients:

| | |
|---|---|
| Lactose _____ g./liter __ | 5 |
| Wilson's Peptone Liquor No. 159 [1] _____ ml./liter __ | 30 |
| Tap water, q.s. balance. | |

[1] Wilson's Peptone Liquor No. 159 is a preparation of hydrolyzed proteins of animal origin.

Each flask is inoculated with 5% seed inoculum. The flasks are incubated at 28° C. on a rotary shaker (250 r.p.m., 6 cm. stroke) for 120 hours. The antibacterial spectrum on a typical 120 hour fermentation is as follows:

| Organism: | Zone (mm.) of inhibition |
|---|---|
| B. subtilis | 0 |
| S. aureus | 23 |
| S. lutea | 28 |
| K. pneumoniae | 0 |
| E. coli | 0 |
| S. schottmuelleri | 0 |
| P. vulgaris | .0 |
| M. avium | 25 |
| P. oxalicum | 0 |

The above antibacterial spectrum is determined by a standard microbiological disc plate assay.

(B) Recovery

Whole fermentation broth, obtained as described above, is filtered using diatomaceous earth as filter aid. The filter cake is washed with 2 liters of water and the wash is combined with the clear filtrate (approximately 9 liters, pH 8.4). The clear filtrate-wash is then passed over a column containing 500 ml. of Amberlite XAD-2 packed in water. The effluent Spent Beer is collected as one fraction. The column is then washed with three liters of water. The aqueous wash is also collected as one fraction designated Aqueous Wash. The column is eluted with methanol-water (95:5 v./v.). A total of 100 fractions (20 ml. each) are collected. The collected fractions are tested for bioactivity against *Sarcina lutea*. Results are as follows:

| Fraction: | Zone (mm.) of inhibition |
|---|---|
| Clear filtrate | 32 |
| Spent beer | 0 |
| Aqueous wash | 0 |
| Methanolic eluate (Fr. No.): | |
| 3 | 0 |
| 6 | 0 |
| 9 | 0 |
| 10 | 0 |
| 12 | 0 |
| 14 | 40.5 |
| 16 | 45.5 |
| 18 | 45 |
| 20 | 43 |
| 25 | 39 |

| Fraction: Methanolic eluate (Fr. No.): | Zone (mm.) of inhibition |
|---|---|
| 30 | 29 |
| 35 | 27.5 |
| 40 | 24.5 |
| 45 | 22 |
| 50 | 20 |
| 55 | 17 |
| 60 | 17 |
| 65 | 13.5 |
| 70 | 12 |
| 75 | 10 |
| 80 | Traces |
| 85 | Traces |
| 90 | Traces |
| 95 | 0 |
| 100 | 0 |

The following fractions obtained by elution with aqueous methanol are combined:

Pool I _____ Fractions 14–25 (Prep A).
Pool II _____ Fractions 26–50 (Prep B).

Preparations A and B are found by thin layer chromatography [on silica gel G using the solvent system consisting of methyl ethyl keton-acetone-water (186:52:20 v./v.)] to contain one bioactive component, which could not be differentiated from lincomycin. These preparations are combined and the solution concentrated to an aqueous and freeze dried. The dry material is then triturated with methylene chloride. The methylene chloride extract is concentrated to dryness. The resulting residue is triturated with acetone (50 ml.). Insoluble material is removed by filtration and the remaining filtrate is mixed with 500 ml. of ether. Again, precipitated material is removed by filtration and the remaining filtrate is mixed with 5 ml. of methanolic hydrogen chloride (1 N). The resulting precipitated colorless lincomycin hydrochloride is isolated by filtration; yield, 230 mg. This material is converted to the crystalline form by crystallization from water-acetone.

The amount of lincomycin B in a normal fermentation of *Streptomyces lincolnensis* var. *lincolnensis* will vary with the media composition, incubation time and temperature, aeration, etc. Under normal operating conditions amounts of lincomycin B in such a fermentation will range from 5 to 10% of the total lincomycin present. The lincomycin B is removed by repeated recrystallization of the lincomycin product in suitable solvents, for example, water-acetone mixtures, or water lower alcohol mixtures. Since the process of the subject invention does not produce lincomycin B, these crystallizations are unnecessary.

What is claimed is:

1. A novel process for preparing the antibiotic lincomycin which comprises cultivating *Streptomyces variabilis* chemovar *liniabilis* Dietz var. nova, having the identifying characteristics of NRRL 5618, and lincomycin producing mutants thereof, in an aqueous nutrient medium under aerobic conditions until substantial antibiotic activity is imparted to said medium by the production of lincomycin.

2. A process, according to claim 1, wherein said aqueous nutrient medium contains a source of assimilable carbohydrate and assimilable nitrogen.

3. A process, according to claim 1, wherein said lincomycin is isolated from the fermentation broth.

References Cited
UNITED STATES PATENTS
3,697,380   10/1972   Argoudelis _____ 195—80 R A. LOUIS MONACELL, Primary Examiner
R. J. WARDEN, Assistant Examiner